US012005729B2

(12) United States Patent
Kim

(10) Patent No.: US 12,005,729 B2
(45) Date of Patent: Jun. 11, 2024

(54) WRITING INSTRUMENT HOLDER FOR CLIP

(71) Applicant: Chun Ki Kim, Gyeonggi-do (KR)

(72) Inventor: Chun Ki Kim, Gyeonggi-do (KR)

(73) Assignee: Chun Ki Kim, Gyeonggi-do (KR)

( * ) Notice: Subject to any disclaimer, the term of this patent is extended or adjusted under 35 U.S.C. 154(b) by 0 days.

(21) Appl. No.: 18/235,331

(22) Filed: Aug. 17, 2023

(65) Prior Publication Data

US 2023/0391131 A1 Dec. 7, 2023

Related U.S. Application Data

(63) Continuation of application No. PCT/KR2021/015548, filed on Nov. 1, 2021.

(30) Foreign Application Priority Data

Feb. 24, 2021 (KR) ........................ 20-2021-0000621
Apr. 14, 2021 (KR) ........................ 20-2021-0001170
May 10, 2021 (KR) ........................ 10-2021-0060184

(51) Int. Cl.
*B43K 25/02* (2006.01)
*B42F 1/02* (2006.01)

(52) U.S. Cl.
CPC .............. *B43K 25/024* (2013.01); *B42F 1/02* (2013.01)

(58) Field of Classification Search
CPC ..... B42F 1/02; B42F 9/00; B42F 1/00; B43K 25/024; B43K 23/00; B43K 25/02;
(Continued)

(56) References Cited

U.S. PATENT DOCUMENTS 2,549,200 A * 4/1951 Hooks .................. B43K 23/001 211/89.01
3,911,531 A * 10/1975 Buturuga ................ B42F 1/006 D19/86

(Continued)

FOREIGN PATENT DOCUMENTS

CN 102079194 A 6/2011
CN 201931781 U 8/2011

(Continued)

OTHER PUBLICATIONS

Espacenet English translation WO2016/039153, (Year 2016), Mar. 7, 2024, 7 pages.*

(Continued)

*Primary Examiner* — Robert Sandy
*Assistant Examiner* — Louis A Mercado
(74) *Attorney, Agent, or Firm* — Nicholas Park

(57) ABSTRACT

A writing instrument holder for clip is disclosed. The writing instrument holder for clip is detachable from a clip having a clip body which is bent to have an insertion space into which a document is inserted, is closed by an elastic restoring force, and pressurizes the document, and a pair of handles which are coupled to the clip body and pressurize the clip body to widen, and includes a body unit, a fixing unit, and an elastic unit. The body unit is provided in the insertion space and comes in close contact with the inner surface of the clip body. The elastic unit connects the body unit and the fixing unit.

1 Claim, 5 Drawing Sheets

(58) Field of Classification Search
CPC ..... B43K 23/001; Y10T 24/205; Y10T 24/20; Y10T 24/1321
See application file for complete search history.

(56) References Cited

U.S. PATENT DOCUMENTS

| | | | | | |
|---|---|---|---|---|---|
| 4,521,035 | A * | 6/1985 | Berezowsky | B42F 9/00 | 281/48 |
| 5,460,346 | A * | 10/1995 | Hirsch | A45F 5/02 | 248/231.51 |
| 5,640,743 | A * | 6/1997 | Greene | B42F 1/10 | 24/11 CT |
| 5,651,468 | A * | 7/1997 | Irizarry | F16M 11/041 | 84/329 |
| 6,206,543 | B1 * | 3/2001 | Henry | A45F 5/02 | 362/396 |
| 6,327,749 | B1 * | 12/2001 | Antinone | B42F 1/006 | 24/67.5 |
| D994,769 | S * | 8/2023 | Kim | D19/81 | |
| 2005/0108857 | A1 * | 5/2005 | Wartian | B43K 23/002 | 24/10 R |
| 2005/0223525 | A1 * | 10/2005 | Wartian | B43K 23/002 | 24/336 |
| 2008/0121773 | A1 * | 5/2008 | Huang | B43M 99/008 | 248/310 |

FOREIGN PATENT DOCUMENTS

| | | | | |
|---|---|---|---|---|
| JP | 2002-048111 A | 2/2002 | | |
| JP | 2007-090720 A | 4/2007 | | |
| KR | 20-2017-0001872 U | 5/2017 | | |
| WO | WO-2016039153 A1 * | 3/2016 | | B42F 1/02 |

OTHER PUBLICATIONS

WIPO, International Search Report and International Written Opinion for International Application No. PCT/KR2021/015548, May 26, 2022, 9 pages.

* cited by examiner

WRITING INSTRUMENT HOLDER FOR CLIP

CROSS-REFERENCE TO RELATED APPLICATION

This application is a US Bypass Continuation application of International Application No. PCT/KR2021/015548, filed on Nov. 1, 2021, which claims priority to and the benefit of Korean Patent Application No. 20-2021-0000621, filed on Feb. 24, 2021, Korean Patent Application No. 20-2021-0001170, filed on Apr. 14, 2021, and Korean Patent Application No. 10-2021-0060184, filed on May 10, the disclosure of which is incorporated herein by reference in its entirety.

BACKGROUND

Technical Field

The present invention relates to a writing instrument holder for a clip, and more particularly, to a writing instrument holder for a clip having various use conveniences.

Related Art

A clip, also called a paper clamp or a binder clip, typically have a structure in which a pair of handles are mounted on the clip body. The user can open a clip body by pressing the handle, and a clip is used for gathering and combining several documents.

However, since conventional a clip does not have a function of attaching a writing instrument, it is inconvenient to carry the writing instrument separately from the document combined by a clip.

SUMMARY

Technical Problem

In order to solve the above problems, the technical problem to be achieved by the present invention is to provide a writing instrument holder for a clip having various convenience of use.

The technical problems to be solved by the present invention are not limited to the technical problems mentioned above, and other technical problems not mentioned will be clearly understood by those skilled in the art from the following description.

Technical Solution

To achieve the technical purpose, one embodiment of the present invention provides a writing instrument holder for a clip which is detachable from a clip and has: a clip body including a pair of clip pieces formed to press a document and a connecting piece connecting to the pair of clip pieces, wherein the clip body configured to compress the document by an elastic restoring force; a pair of handles coupled to the clip body and configured to press the clip body to open; a body unit positioned within the clip body, providing an insertion space which the document is inserted, and in close contact with an inner surface of the clip body; a fixing unit connected to the body unit, located on an outer surface of the clip body, configured to fix the body unit to the clip body; and a writing instrument fixing space formed between the fixing unit and the connecting piece, the writing instrument fixing space configured to fix a writing instrument, wherein the fixing unit is formed in a longitudinal direction of the body unit by a pair of cutting lines formed in the body unit.

In an embodiment of the present invention, the fixing unit may be formed in the longitudinal direction of the body unit by a pair of cutting lines formed in the body unit.

According to an embodiment of the present invention, a fixing protrusion formed on an inner surface of the fixing unit to press and fix a writing instrument inserted into the writing instrument fixing space.

In an embodiment of the present invention, the fixing unit may have the corrugations formed on the fixing unit to press and fix a writing instrument inserted into the writing instrument fixing space.

DETAILED DESCRIPTION

Figure 1:
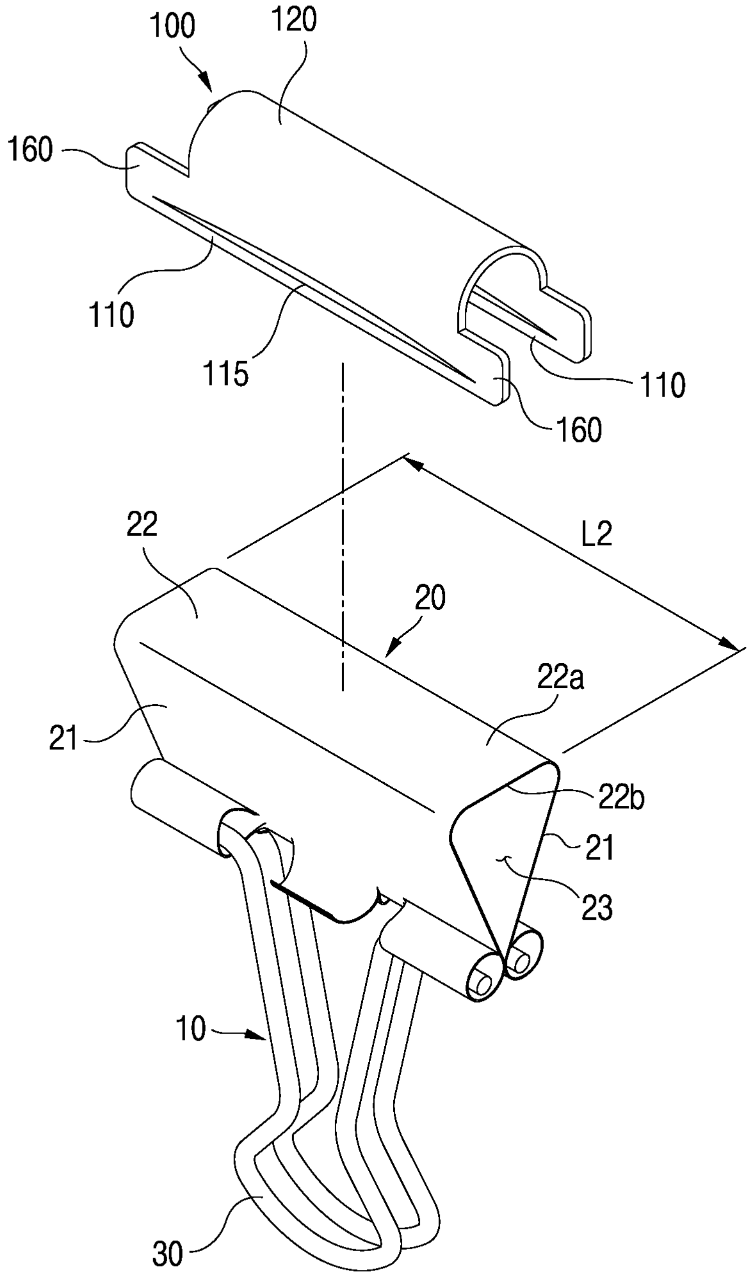
FIG. 1 is an exemplary view illustrating a state in which a writing instrument holder for a clip and a clip is separated according to an embodiment of the present invention.

Hereinafter, the present invention will be described with reference to the accompanying drawings. However, the present invention may be implemented in various different forms, and thus is not limited to the embodiments described herein. In order to clearly describe the present invention in the drawings, parts not related to the description are omitted, and similar parts are denoted by similar reference numerals throughout the specification.

Throughout the specification, when a part is "connected (connected, contacted, or coupled)" to another part, this includes not only a case where the part is "directly connected" but also a case where the part is "indirectly connected" via another member interposed therebetween. In addition, when a part "includes" a component, this means that other components may be further included, rather than excluding other components, unless otherwise stated.

The terminology used herein is for the purpose of describing particular embodiments only and is not intended to be limiting of the invention. A singular expression includes a plural expression unless the context clearly indicates otherwise. In the present specification, it should be understood that the term "include" or "have" indicates that a feature, a number, a step, an operation, a component, a part, or a combination thereof described in the specification is present, but does not exclude the possibility of presence or addition of one or more other features, numbers, steps, operations, components, parts, or combinations thereof in advance.

Hereinafter, embodiments of the present invention will be described in detail with reference to the accompanying drawings.

Figure 2:
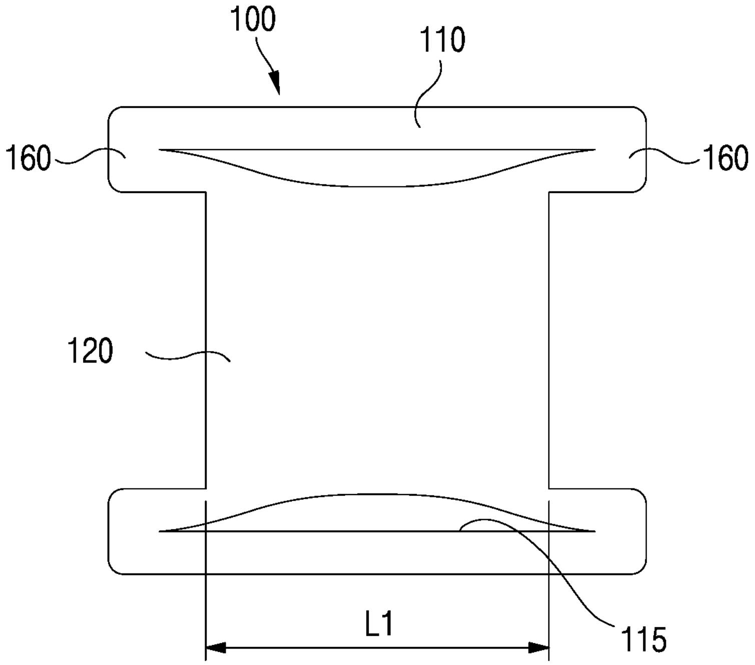
FIG. 2 is an exemplary view showing a holder of a writing instrument holder for a clip according to an embodiment of the present invention.
Figure 3:
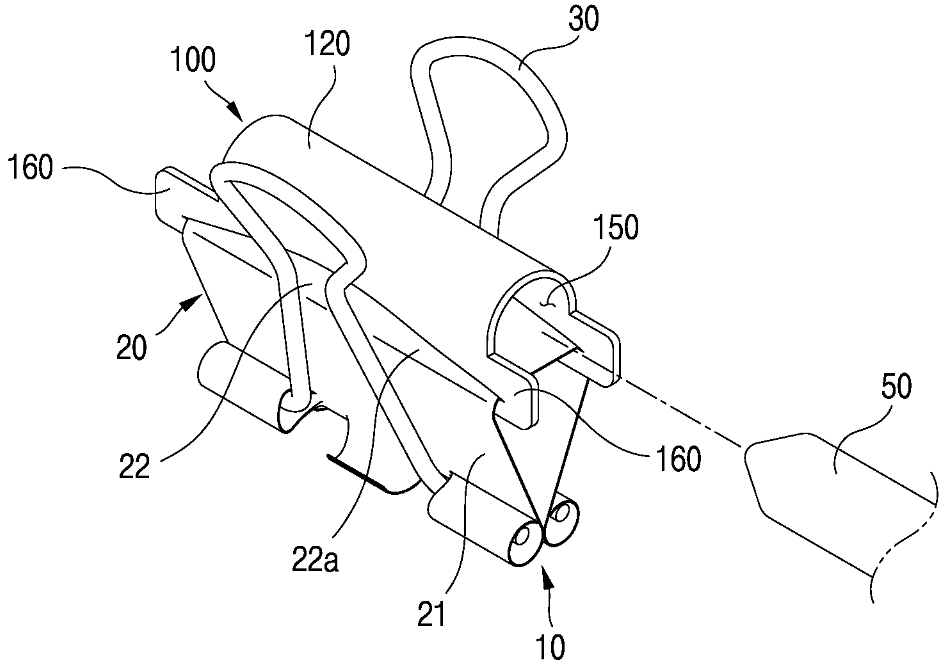
FIG. 3 is an exemplary view illustrating a state in which a writing instrument holder for a clip according to an embodiment of the present invention is coupled to a clip.

FIG. 1 is an exemplary view illustrating a state in which a writing instrument holder for a clip and a clip is separated according to an embodiment of the present invention, FIG. 2 is an exemplary view illustrating a writing instrument holder for a clip according to an embodiment of the present invention, and FIG. 3 is an exemplary view illustrating a state in which a writing instrument holder for a clip according to an embodiment of the present invention is coupled to the clip.

As shown in FIGS. 1 to 3, the writing instrument holder for a clip 100 may be detachable from a clip 10.

The writing instrument holder for clip 100 according to the present invention may be used while being coupled to the clip 10 having a clip body 20 that is bent to have an insertion space 23 into which a document is inserted and that is folded by an elastic restoring force and a pair of handles 30 that are coupled to the clip body 20 and pressurize the clip body 20 so as to widen. The clip body 20 may include a pair of clip pieces 21 and a connecting piece 22 connecting the clip pieces 21 to each other.

In addition, the writing instrument holder for clip 100 for pincers according to the present embodiment may include a body unit 110, a fixing unit 120, and an elastic unit 160.

The body unit 110, the fixing unit 120, and the elastic unit 160 may be made of a flexible material having elasticity and friction force, and for example, rubber or silicon may be used as the flexible material. In addition, the body unit 110, the fixing unit 120, and the elastic unit 160 may be integrally formed.

The body unit 110 may be formed to be longer than the connecting piece 22 of the clip body 20. When the writing instrument holder for clip 100 is coupled to the clip body 20, the body unit 110 may be located in the insertion space 23, and the fixing unit 120 may be located outside the connecting piece 22.

The fixing unit 120 may be formed by a pair of cutting lines 115 formed in the body unit 110. The cutting line 115 may be formed in the longitudinal direction of the body unit 110, and thus the fixing unit 120 may be formed in the longitudinal direction of the body unit 110. The cutting line 115 may be formed longer than the connecting piece 22.

The elastic unit 160 may connect the body unit 110 and the fixing unit 120.

By sequentially inserting and passing the handle 30, the clip piece 21, and the connecting piece 22 of the clip 10 between the cutting lines 115, the writing instrument holder for clip 100 may be coupled to the clip body 20.

When the combination of the writing instrument holder for clip 100 and the clip body 20 is completed, the body unit 110 may be fixed to the insertion space 23, the fixing unit 120 may be positioned on the outer surface 22*a* of the connecting piece 22, and the elastic unit 160 may be positioned outside both end units 22*b* of the connecting piece 22 in the length direction.

In this case, since the material of the writing instrument holder for clip 100 is elastic and the width of the holder 100 is wider than the width of the connecting piece 22, when the holder 100 is mounted on the holder 10, the body unit 110 always comes into close contact with both side surfaces of the inside of the insertion space 23 of the holder 10, and at the same time, a writing instrument fixing space 150 into which the writing instrument 50 is inserted and fixed may be formed between the fixing unit 120 and the connecting piece 22. As a result, when the papers are combined, the paper is not caught on the body unit 110 positioned inside the clip 10, and thus the writing instrument holder for clip 100 can be mounted and used without any hindrance to the original function of the clip 10.

In addition, the length L1 of the fixing unit 120 positioned on the connecting piece 22 is shorter than the length L2 of the connecting piece 22, such that both ends of the connecting piece 22 may be exposed. Therefore, the writing instrument 50 may be easily inserted or removed along the connecting piece 22, and the writing instrument may be attached or detached while being increased or decreased due to elasticity of the elastic unit 160 connecting the body unit 110 and the fixing unit 120.

Accordingly, the fixing unit 120 may fix the body unit 110 to the clip body 20 and simultaneously fix the writing instrument.

The elastic unit 160 may be corrugated so that the elasticity of the elastic unit 160 may be increased.

Figure 4:
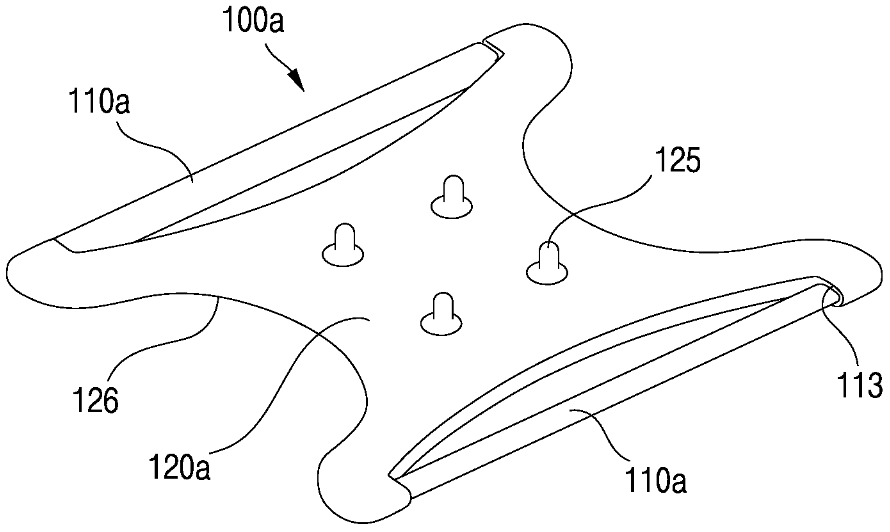
FIG. 4 is an exemplary view illustrating a fixing protrusion of a holder of a writing instrument holder for a clip according to another embodiment of the present invention.

FIG. 4 is an exemplary view illustrating a fixing protrusion of a writing instrument holder for clip according to another embodiment of the present invention.

As shown in FIG. 4, the writing instrument holder for clip 100*a* according to the present embodiment may include a fixing protrusion 125.

The fixing protrusion 125 may be formed on an inner surface of the fixing unit 120*a*, and when the writing instrument holder for clip 100*a* is coupled to the holder, the fixing protrusion 125 may protrude into the writing instrument fixing space 150 (see FIG. 3), and the fixing protrusion 125 may press and fix the writing instrument inserted into the writing instrument fixing space, thereby preventing the inserted writing instrument from easily being separated.

Meanwhile, in FIGS. 1 to 3, it is illustrated that the body unit 110 and the fixing unit 120 are formed to have the same thickness, but the present invention is not necessarily limited thereto, and as shown in FIG. 4, the body unit 110*a* may be formed to have a step 113 with the fixing unit 120*a*.

Further, in FIGS. 1 to 3, the edge of the fixing unit 120 is illustrated as being formed in a straight line shape, but the present invention is not necessarily limited thereto, and as shown in FIG. 4, the edge of the fixing unit 120*a* may be formed in a curved shape 126. Accordingly, stress may be prevented from being concentrated on a unit of the edge of the fixing unit 120*a*, thereby preventing the fixing unit 120*a* from being torn.

Figure 5:
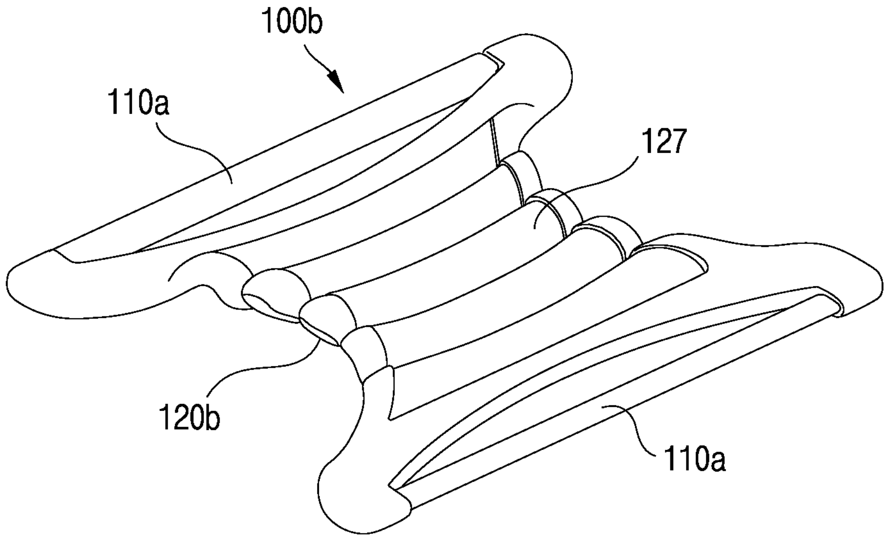
FIG. 5 is an exemplary view illustrating the corrugations of a holder of a writing instrument holder for a clip according to another embodiment of the present invention.

FIG. 5 is an exemplary view illustrating the corrugations of a writing instrument holder for clip according to another embodiment of the present invention.

As shown in FIG. 5, the fixing unit 120*b* of the writing instrument holder for clip 100*b* according to the present embodiment may have the corrugations 127 formed in the fixing unit 120*b* to press and fix the writing instrument inserted into the writing instrument fixing space 150 (see FIG. 3).

The corrugations 127 may be formed by forming the fixing unit 120*b* to be corrugated, but is not limited thereto, and may be formed to protrude from the inner surface of the fixing unit 120*b*.

When the writing instrument holder for clip 100*b* is coupled to the clip, the corrugations 127 may protrude into the writing instrument fixing space 150 (see FIG. 3) to press and fix the writing instrument inserted into the writing instrument fixing space, and accordingly, the inserted writing instrument may be prevented from easily being separated.

According to an embodiment of the present invention, the holder of the writing instrument holder for clip can be made of a flexible material having elasticity and friction, thereby easily being coupled with the clip and stably being fixed to the clip.

In addition, according to an embodiment of the present invention, the writing instrument can be easily fixed on the holder of the writing instrument holder for tongs, thereby increasing the convenience of use.

It should be understood that the effects of the present invention are not limited to the above-described effects, but include all effects that can be deduced from the configuration of the invention described in the detailed description or claims of the present invention.

The above description of the present invention is for illustrative purposes, and it will be understood by those of ordinary skill in the art that the present invention can be modified into other specific forms without changing the technical idea or essential easily feature of the present invention. Therefore, it should be understood that the embodiments described above are exemplary and not restrictive in all aspects. For example, each feature element described as a single element may be distributed and implemented, and similarly, feature elements described as being distributed may be implemented in a combined form.

The scope of the present invention is represented by the following claims, and it should be interpreted that the meaning and scope of the claims and all changes or modifications derived from the concept of equality are included in the scope of the present invention.

The present invention is industrially applicable in the field of writing instrument holder for clip technology having various ease of use.

What is claimed is:

1. A writing instrument holder for clip attachable to and detachable from a clip, the writing instrument holder for clip comprising:

a clip body including a pair of clip pieces formed to press a document and a connecting piece connecting to the pair of clip pieces, wherein the clip body configured to compress the document by an elastic restoring force;

a pair of handles coupled to the clip body and configured to press the clip body to open;

a body unit positioned within the clip body, providing an insertion space configured to insert the document, and in close contact with an inner surface of the clip body;

a fixing unit connected to the body unit, located on an outer surface of the clip body, configured to fix the body unit to the clip body;

an elastic unit connecting the body unit and the fixing unit; and a writing instrument fixing space formed between the fixing unit and the connecting piece, the writing instrument fixing space configured to fix a writing instrument, wherein the fixing unit is formed in a longitudinal direction of the body unit by a pair of cutting lines that are longer than a length of the clip body formed in the body unit, and wherein the elastic unit protrudes outward from both ends of the fixing unit.

* * * * *